Nov. 10, 1925.

F. H. SCHOFIELD

OPTICAL PYROMETER OR SIMILAR INSTRUMENT

Filed July 15, 1922

1,560,864

Francis Harold Schofield,
Inventor,
by [signature]
Attorney.

Patented Nov. 10, 1925.

1,560,864

UNITED STATES PATENT OFFICE.

FRANCIS HAROLD SCHOFIELD, OF TEDDINGTON, ENGLAND.

OPTICAL PYROMETER OR SIMILAR INSTRUMENT.

Application filed July 15, 1922. Serial No. 575,215.

*To all whom it may concern:*

Be it known that I, FRANCIS HAROLD SCHOFIELD, a subject of the King of Great Britain and Ireland, and resident of No. 57 Blackmores Grove, Teddington, in the county of Middlesex, England, have invented a new and useful Improvement in or Relating to Optical Pyrometers or Similar Instruments.

The invention relates to optical instruments, more particularly optical pyrometers and illuminometers, for measuring the temperature of a glowing body, or illumination falling upon a surface, of the kind wherein the temperature or the intensity of light of the glowing body or the illumination of the surface is measured by the aid of an electric standard lamp. In such instruments, the intensity of radiation of the electric standard lamp is adjusted by adjusting the electric current passing through the lamp, until the brightness of the standard lamp matches the brightness of the incandescent body whose temperature is to be measured, or until the illuminations are balanced.

Two kinds of circuit arrangements have been hitherto proposed for reading the temperature of the standard lamp by means of a galvanometer. In the one kind of circuit arrangement, the scale of the galvanometer is directly used as the scale of temperature or illumination, the galvanometer being arranged either in series or in shunt to the standard lamp. Such an arrangement has the disadvantage that the usual range of temperature or illumination of the instrument corresponds only to a portion of the galvanometer scale. For instance, in the case of a pyrometer, the range 700° to 1,300° centigrade corresponds only to the second half of the galvanometer scale and the first half corresponding to zero degrees to 700° centigrade is wasted. The result of this is that the effective length of the scale of the instrument is very much cramped or restricted. Various ways have been suggested for obviating this difficulty, as for example, by either permanently or adjustably setting back the galvanometer zero, or contracting the first half of the scale by appropriate shaping of the pole pieces of the galvanometer. It was therefore necessary in order to make the whole length of the galvanometer scale correspond to the desired range of temperature, to provide separate means, for instance, an additional circuit with an independent source of current which obviously complicates both the construction and the operation of the instrument. Another disadvantage of the above mentioned type of pyrometer is that if the scale of the galvanometer is engraved so as to give directly the temperatures corresponding to the values of the current through a particular lamp, when that lamp is broken, it is not generally possible to replace it by another lamp having an identical relationship of temperature and current. This feature is a serious disadvantage to the maker and user of the pyrometer and it rises out of the difficulty of manufacturing lamps, the filaments of which will be identical in length, cross section, electrical resistance and surface emissivity.

In the second kind of circuit arrangement, the temperature of the standard lamp is measured by the aid of a Wheatstone bridge, and it has been suggested in connection with this circuit arrangement to combine certain compensating resistances with the standard lamp so as to form an interchangeable unit. In this known arrangement the galvanometer is connected across the two branches of the Wheatstone bridge, one end of the cross connection being permanently connected to one branch of the bridge and the other end of the cross connection having a sliding contact with resistances forming the arms of the other branch of the bridge. The bridge is balanced for each reading of the instrument by varying the ratio of the resistance of the two arms of one branch until the current flowing through the galvanometer is zero and the temperature of the standard lamp is then read not upon the scale of the galvanometer, but upon a scale adjacent to the path of adjustment of the movable point of the cross connection. It is therefore necessary to perform two operations, namely, first adjust the current flowing through the lamp until the intensity of radiation or illumination matches that of the glowing body or illuminated surface, and then adjust the bridge until the current flowing through the galvanometer is zero.

The object of the present invention is to provide an instrument which combines the advantages of the two above mentioned circuit arrangements and avoids the disadvantages inherent to these arrangements.

In the improved instrument forming the subject of this invention, the temperature of the standard lamp may be read directly upon the scale of the galvanometer and the whole scale of the galvanometer is utilized as the temperature scale of the instrument without the necessity of any additional operation or adjustment. In other words, the object of the invention is to provide an instrument in which after the usual adjustment of the current flowing through the lamp, it is not necessary to effect a further adjustment either for resetting the zero of the galvanometer or for balancing the bridge, and yet it is possible to read immediately the temperature of the standard lamp upon a scale the length of which is fully utilized. The invention also provides for interchangeability of the lamp without the necessity for re-calibrating or adjusting the instrument.

With these objects in view, my invention resides in the method and apparatus hereinafter described and ascertained. For illustration of some of the modes for practising my methods and some of the forms my apparatus may take, reference is to be had to the accompanying drawings, in which:—

Figure 1:
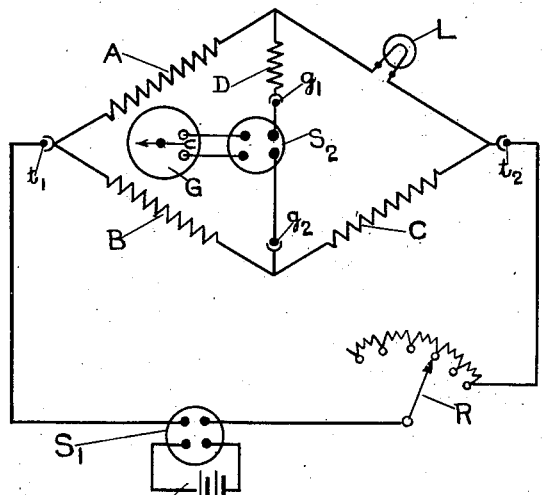
Figure 1 is a diagrammatic view showing the preferred circuit arrangement.
Figure 4:
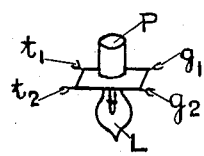
Figure 4 is an illustration of one form of interchangeable unit.
Figure 5:
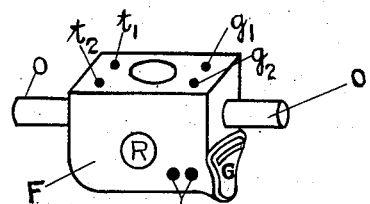
Figure 6:
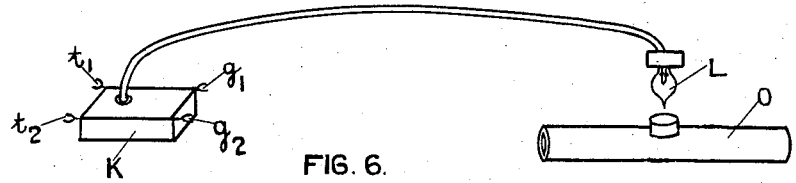
Figure 7:
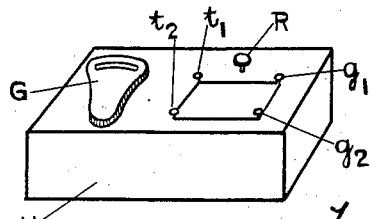

Figure 5 is an illustration of an optical pyrometer in which the interchangeable unit shown in Fig. 4 may be used, Figure 6 shows another form of interchangeable unit and the telescope tube of the instrument, Figure 7 is an illustration of the remaining part of the instrument in which the interchangeable unit shown in Fig. 6 may be used, In Fig. 1 of the accompanying drawing, L is the pyrometer lamp, and A, B, C and D are resistances which are preferably composed of material having a zero or very low change of resistance with temperature, though it is only necessary for purposes of my invention that A B C should change in resistance in a different proportion to the lamp L when the current through the bridge is altered.

R is an adjustable rheostat, T is a battery and G is a galvanometer. $S_1$ is a reversing switch in the main circuit. $S_2$ is an alternative reversing switch in the galvanometer connection. The resistances of A and B constituting the ratio arms of the bridge, are generally made equal though not necessarily so, and the resistance C is so adjusted that when a particular current is flowing through the lamp L (which corresponds to a particular temperature) the bridge is in balance. When the current through the lamp, and therefore through the bridge, is increased by adjusting the rheostat R the resistance of the lamp will be altered in a different proportion to that of the arms A B and C and an out of balance deflection will be caused in the galvanometer G. This deflection corresponds to a higher temperature of the lamp. If on the other hand the current in the lamp and bridge is decreased this will cause a fall in the temperature and resistance of the lamp and will give an out of balance deflection of G in the reverse direction. By adjusting the sensitivity of the galvanometer by means of the series resistance D, or otherwise, any desired change of temperature can be made to correspond to a particular length of the galvanometer scale.

Figure 2:
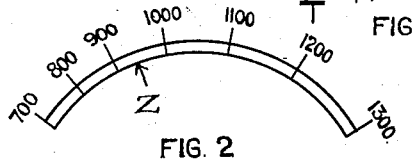
Figure 2 is an illustration of one scale made available by my invention.

In the case of a galvanometer designed to give readings on one side only of the zero position, the desired temperature range (say 700° to 1300° centigrade) can be obtained by balancing the bridge for the lower limit (700° centigrade) and making the higher limit (1300° centigrade) correspond to the other end of the galvanometer scale, or vice versa. A typical temperature scale on a galvanometer which has been obtained as above described is shown in Fig. 2.

Figure 3:
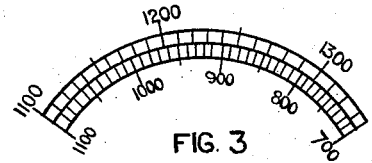
Figure 3 is an illustration of another scale made available by my invention.

Alternately an intermediate temperature (say 1100° centigrade) may be chosen on which to balance the bridge, giving a range 1100° to about 1300° centigrade for the deflection in one direction and by reversing the battery or galvanometer connections by means of switch $S_1$ or $S_2$, a range of 1100° to 700° centigrade corresponding to the deflection in the other direction. By adopting this method, the desired temperature range can be made to correspond to double the length of the galvanometer scale. A temperature scale obtained on a galvanometer in this way is shown in Fig. 3 and it will be seen that the desired temperature range 700° to 1330° centigrade has been made to correspond to double the length of the galvanometer scale.

In the description and illustrations given above the zero of the galvanometer has been taken as a coincident with one end of the scale, but it will readily be understood that the making of any particular temperature range to correspond to the whole length of the galvanometer scale is independent of the position on the scale of the galvanometer zero, provided of course that the position is fixed.

If the galvanometer is of a type which shows large changes of sensitivity with temperature, a considerable change in temperature of the room in which the instrument is used from the temperature for which the instrument was calibrated will introduce no error at the zero position of the galvanometer, but will cause errors at other parts of the scale increasing with the distance from the zero position. If the temperature scale divisions were equal in size throughout the range, the position of the zero, which would reduce to a minimum the errors due to this cause would be at the mid-point. Since, however, the temperature divisions are not equal (see Figs. 2 and 3) the position of the zero giving the minimum of error expressed in temperature will not be at the mid-point, but at the point which divides the scale into two portions, the ratios of the length of which will be equal to the lengths corresponding to 1° centigrade at the respective ends of the scale. If the errors of the above-mentioned kind are important, I accordingly arrange the galvanometer zero at the particular position which reduces these errors to a minimum, for example the position shown at Z in Fig. 2.

In one convenient and compact embodiment of the invention, the lamp and the other three arms A, B, and C of the bridge and the resistance D are permanently connected by soldered joints or otherwise to form a single unit. This unit is inserted into the pyrometer and makes connections with the battery and galvanometer by means of four suitable contacts, which are shown at the positions marked $g_1$ $g_2$ $t_1$ $t_2$ of Fig. 1. Should the lamp L be broken, the unit can be detached at the points $g_1$ $g_2$ $t_1$ $t_2$ and can be replaced by another unit which is adjusted so that it will give the same temperature range on the galvanometer G. Assuming that the characteristics of the galvanometer are known, the adjustment of the new unit is effected in the manner already explained, by choosing such values for the resistance A, B, C, D as will give the required temperature range for the two ends of the galvanometer scale. Now it is found that, for units comprising lamps of similar make, if the two ends of the temperature scale are thus made to correspond, the intermediate points on the temperature scale will also correspond within the limits of accuracy to which readings can be taken. In this way, my invention enables the manufacturer to make up any number of lamp units which will be interchangeable with respect to a particular galvanometer, or, if his galvanometers are standardized, interchangeable for all his instruments designed for the same temperature range.

In order to make clear the manner in which the system of interchangeable units can be arranged, I show in Figs. 4, 5, 6 and 7 two methods of carrying out my invention. Fig. 5 shows the pyrometer instrument which consists of the box F to which are attached the tubes OO containing the objective and eyepiece lenses of the telescope. To the box is attached also one galvanometer G, the rheostat R, the contacts M for connection to the battery and four contact points are provided which correspond to $g_1$ $g_2$ $t_1$ $t_2$ of Fig. 1. Fig. 4 shows the lamp L which has a cap P over its base and enclosing the resistances A, B, C, D and this unit is provided with four contact points corresponding to $g_1'$ $g_2'$ $t_1'$ $t_2'$. On inserting the lamp into the appropriate position in the pyrometer instrument connection is made, by screws or otherwise, between the points $g_1$ $g_2$ $t_1$ $t_2$ of Figs. 4 and 5, thus making up the complete system represented in Fig. 1.

In the case of Fig. 7 a separate box H holds the battery, the galvanometer G and rheostat R. A recess is provided in this box surrounded by four contact points $g_1$ $g_2$ $t_1$ $t_2$. Fig. 6 shows a box K containing the resistances A, B, C, D with long flexible leads to the lamp L. This unit has four contact points $g_1$ $g_2$ $t_1$ $t_2$ and on insertion of the box K into the recess in box H, the complete system represented by Fig. 1 is made up. The lamp L is clamped at the same time into the telescope tube O.

In the foregoing description of the invention it is assumed that the resistance of the comparison lamp, and therefore the deflection of the galvanometer, will always be the same whenever the lamp is matched in intensity against a hot body at the same temperature. As is well known in the art this is true of the portion of the lamp filament which is incandescent but it can be shown that the resistance of the fine leading-in-wires, which will be very much cooler, will vary appreciably with the temperature of the pyrometer instrument, which in turn is affected by changes of atmospheric temperature. The errors thus introduced into the readings of the instrument are small and can generally be neglected; but where the greatest accuracy is demanded, these errors are compensated out by making that part of the resistance C which corresponds in resistance to the leading-in-wires of the lamp, of material having the same variation of resistance with temperature as the material composing the leading-in-wires.

I claim:—

1. An optical pyrometer making use of the variation in the intensity of radiation of an electric lamp due to changes in the current passing through the filament, comprising: a source of electric power variable at will arranged in the main circuit, a Wheatstone bridge, an electric incandescent filament lamp located in one arm of the bridge, three resistances constituting the two ratio arms and the fourth arm of the bridge, a galvanometer connected to fixed points of the bridge, said resistances being such that for some particular current in the lamp the bridge is in balance while for other currents an out of balance deflection will be caused in the galvanometer, and a resistance associated with the galvanometer and fixing its sensitivity so that the limits of the out of balance deflections correspond to the whole length of the galvanometer scale.

2. An optical pyrometer making use of the variations in the intensity of radiation of an electric lamp due to changes in the current passing through the filament, comprising: a source of electric power variable at will arranged in the main circuit, a Wheatstone bridge, an electric incandescent filament lamp located in one arm of the bridge, three resistances constituting the two ratio arms and the fourth arm of the bridge, a galvanometer connected to fixed points of the bridge, said resistances being such that for some particular current in the lamp the bridge is in balance while for other currents an out of balance deflection will be caused in the galvanometer, and a resistance associated with the galvanometer and fixing its sensitivity so that the limits of the out of balance deflections correspond to the whole length of the galvanometer scale, the said lamp and the other three arms of the Wheatstone bridge together with the resistance controlling the sensitivity of the galvanometer being permanently connected together so as to form an exchangeable unit.

3. An optical pyrometer making use of the variation in the intensity of radiation of an electric lamp due to changes in the current passing through the filament, comprising; a source of electric power variable at will arranged in the main circuit, a Wheatstone bridge, an electric incandescent filament lamp located in one arm of the bridge, three resistances constituting the two ratio arms and the fourth arm of the bridge, a galvanometer connected to fixed points of the bridge, said resistances being such that for some particular current in the lamp the bridge is in balance while for other currents an out of balance deflection will be caused in the galvanometer, and a resistance associated with the galvanometer and fixing its sensitivity so that the limits of the out of balance deflections correspond to the whole length of the galvanometer scale, the lamp and the other three arms of the Wheatstone bridge together with the resistance controlling the sensitivity of the galvanometer being permanently connected together and provided with two pairs of contact points corresponding to the points of connection from the source of power and galvanometer respectively so as to form an exchangeable unit.

4. An optical pyrometer making use of the variation in the intensity of radiation of an electric lamp due to changes in the current passing through the filament, comprising: a source of electric power variable at will arranged in the main circuit, a Wheatstone bridge, an electric incandescent filament lamp located in one arm of the bridge, three resistances constituting the two ratio arms and the fourth arm of the bridge, a galvanometer connected to fixed points of the bridge, said resistances being such that for some particular current in the lamp the bridge is in balance while for other currents an out of balance deflection will be caused in the galvanometer, a resistance associated with the galvanometer and fixing its sensitivity so that the limits of the out of balance deflections correspond to the whole length of the galvanometer scale, means for reversing the direction of the current in the galvanometer, and a temperature scale comprising two superposed parts reading in opposite directions, one end of the scale corresponding to the zero position of the galvanometer.

5. An optical pyrometer according to claim 1, in which the resistance constituting the fourth arm of the bridge is made partly of material showing a zero or very small change of resistance with temperature, and partly of material having a co-efficient of change of resistance with temperature which is approximately equal to that of the fine leading-in wires of the lamp for the purpose of insuring accurate readings of the instrument, independently of changes of the temperature in the surroundings of the instrument.

July 5th, 1922.

FRANCIS HAROLD SCHOFIELD.